United States Patent [19]

Baba

[11] 4,428,068
[45] Jan. 24, 1984

[54] IC WITH BUILT-IN ELECTRICAL QUALITY CONTROL FLAG

[75] Inventor: Fumio Baba, Kawasaki, Japan

[73] Assignee: Fujitsu Limited, Kawasaki, Japan

[21] Appl. No.: 320,541

[22] Filed: Nov. 12, 1981

[30] Foreign Application Priority Data

Nov. 13, 1980 [JP] Japan ................................ 55-159871

[51] Int. Cl.³ ..................... G11C 29/00; G01R 31/28; H01L 27/00
[52] U.S. Cl. .................................... 365/200; 365/201; 307/238.1; 324/113; 340/653
[58] Field of Search ....................... 365/200, 201, 244; 307/200 R, 238.1, 499, ; 324/73 PC, 117, 113; 328/121; 340/514, 653

[56] References Cited

U.S. PATENT DOCUMENTS 4,281,398  7/1981  McKenny et al. ................ 365/200

Primary Examiner—George G. Stellar
Attorney, Agent, or Firm—Staas & Halsey

[57] ABSTRACT

An integrated semiconductor circuit device is provided with a special purpose readable indicator without providing additional pins. The indicator may be utilized to store information pertinent to the operativeness of the integrated circuit. The results of quality control monitoring may be written into the store to serve as a flag. A specific application is in semiconductor memory arrays having redundancy memory capability to automatically replace defective memory cells in the primary array. To enable one to know whether or not the redundancy memory array is being used, this information is written into a quality control storage cell. This cell may be a ROM system which may be accessed during a check mode.

13 Claims, 6 Drawing Figures

IC WITH BUILT-IN ELECTRICAL QUALITY CONTROL FLAG

BACKGROUND OF THE INVENTION

The present invention relates to a semiconductor device and, more particularly, to a semiconductor device incorporating means for identifying the state of the device.

For example, in a semiconductor memory device, a large number of memory cells are arranged along rows and columns which are orthogonal to each other. A density of defects generated in such a semiconductor memory device during the manufacture thereof is relatively independent of the integration density of the device, but is dependent on semiconductor manufacturing technology. Therefore, the higher the integration density of the device, the greater the ratio of the number of normal memory cells to that of defective memory cells. This is one of the advantages obtained by increasing the integration density of a semiconductor memory device. However, even if the device includes only one defective memory cell, the device cannot be operated normally and, therefore, the device must be abandoned.

In order to be able to operate a semiconductor memory device despite such a defective memory cell, a semiconductor memory device has been known in which a redundancy memory cell array is incorporated with a main memory cell matrix along the rows or the columns thereof. In this device, when a defective memory cell is detected, the redundancy memory cell array is used instead of a row memory cell array or a column memory cell array which includes a defective memory cell. Therefore, in a semiconductor memory device by incorporating a redundancy memory cell array, the manufacturing yield can be improved.

In such a semiconductor memory device incorporating a redundancy memory cell array, from the point of view of quality control, it is important to know whether or not the redundancy memory cell array is being used. One approach is to provide a bit ROM (read only memory) of a fuse type which serves as a flag register. If the redundancy memory cell array is used, "0" is written into the ROM, while, if the redundancy memory cell array is not used, "1" is written into the ROM. However, in order to read information stored in the ROM, terminals therefor must be provided in the device, so that the device becomes large.

It should be noted that such information stored in the ROM is rarely read out; that is, the information is read out only during the check mode.

SUMMARY OF THE INVENTION

It is an object of the present invention to provide a semiconductor device incorporating means for identifying the state of the device, for example, for identifying whether or not a redundancy memory cell array is used, without having terminals that are used exclusively for the identifying means.

According to the present invention, there is provided a semiconductor device including first, second and third external terminals and a circuit, connected to the first, second and third external terminals, for identifying the state of the device. Information stored in the identifying circuit being read out by detecting the conductance between the first and second external terminals, when a potential of each of the first and second external terminals are different and at a low level and the potential of the third external terminal is at a high level.

The present invention will be more clearly understood from the following description with reference to the accompanying drawings.

DESCRIPTION OF THE PREFERRED EMBODIMENT

Figure 1:
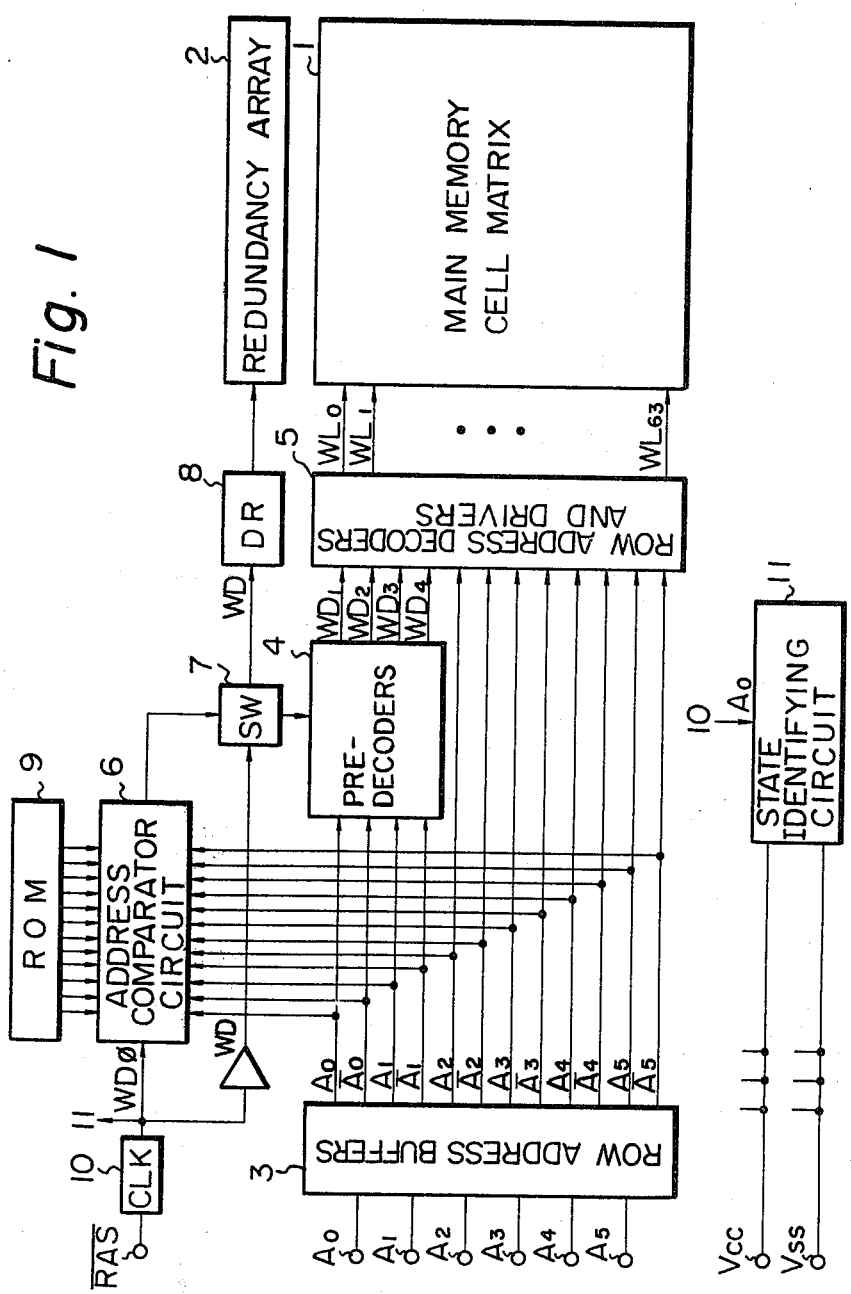
FIG. 1 is a block circuit diagram illustrating an embodiment of the semiconductor device according to the present invention.

In FIG. 1, which illustrates an embodiment of the semiconductor device according to the present invention, 1 is a main memory matrix which is, for example, 4096 ($=2^{12}$) dynamic or static MOS memory cells and 2 is a redundancy memory cell array incorporated in the device with the main memory cell matrix 1 and is in parallel with the rows thereof. 3 is row address buffers for converting address signals $A_0(=2^0)$, $A_1(=2^1)$, ..., $A_5(=2^5)$ of a TTL level into address signals $A_0, A_1, ..., A_5$ of a MOS level and their inverted signals $\overline{A_0}, \overline{A_1}, ..., \overline{A_5}$ which are supplied to pre-decoders 4 and row address decoders and drivers 5 for selecting one row memory cell array within the main memory cell matrix 1. In addition, the address signals $A_0, \overline{A_0}, A_1, \overline{A_1}, ..., A_5, \overline{A_5}$ are also supplied to an address comparator circuit 6 for selecting the redundancy memory cell array 2 via a switch 7 and a driver 8.

If a defective memory cell is detected in the main memory cell matrix 1, a row address to which the defective memory cell belongs is written into a ROM 9. As a result, the address comparator circuit 6 compares the address signals $A_0, \overline{A_0}, A_1, \overline{A_1}, ..., A_5, \overline{A_5}$ from the row address buffers 3 with the defective row address stored in the ROM 9. If the address signals $A_0, \overline{A_0}, A_1, \overline{A_1}, ..., A_5, \overline{A_5}$ do not correspond to the defective row address, the address comparator circuit 6 activates the switch 7 so as to supply a clock signal WD to the pre-decoders 4. As a result, the pre-decorders 4 generate clock signals $WD_1$, $WD_2$, $WD_3$ and $WD_4$ so that one submatrix within the memory cell matrix 1 is selected. Further, the row address decoders and drivers 5 select one row memory cell array within each submatrix. However, when the address signals $A_0, \overline{A_0}, A_1, \overline{A_1}, ..., A_5, \overline{A_5}$ correspond to the defective row address, the address comparator circuit 6 activates the switch 7 so that the clock signal WD is supplied to the driver 8. As a result, the redundancy memory cell array 2 is selected and, accordingly, any of the memory cells of the array can be selected. On the other hand, the pre-decoders 4 cannot perform a selection operation even when the pre-decoders 4 receive the address signals $A_0, \overline{A_0}, A_1$ and $\overline{A_1}$ from the row address buffers 3.

Note that the address comparator circuit 6 is activated by a clock signal $WD\phi$ generated from a clock 10 which, in turn, receives a row address strobe signal $\overline{RAS}$. In addition, the device of FIG. 1 comprises column address buffers, column address decoders and drivers, sense amplifiers and the like which are, however, omitted in FIG. 1 for the sake of simplicity.

According to the present invention, a state identifying circuit 11 is provided so as to identify a state of the device of FIG. 1. In this case, the state identifying circuit 11 stores information concerning whether the redundancy memory cell array is being used; that is, whether or not a defective memory cell is detected in the main memory cell matrix 1. As is understood from FIG. 1, the state identifying circuit 11 does not require any additional terminals. Note that the power supply terminals $V_{cc}$ and $V_{ss}$ are not used exclusively for the state identifying circuit 11.

Next, the state identifying circuit 11 will be explained. The state identifying circuit 11 according to the present invention comprises a ROM element and one or two switching circuits. In general, there are various types of ROMs; that is, a fuse-type ROM, a transistor-type ROM, a FAMOS-type ROM and the like. Any type of a bit ROM serves as a two-terminal element. Therefore, the presence and absence of conductance between the two terminals of the ROM represents information "0" and "1", respectively.

Figure 3:
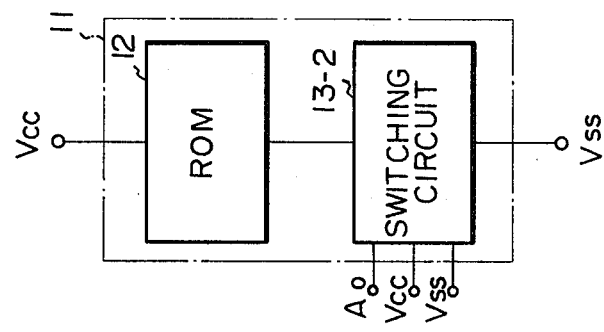
FIG. 3 is a modification of FIG. 2.
Figure 2:
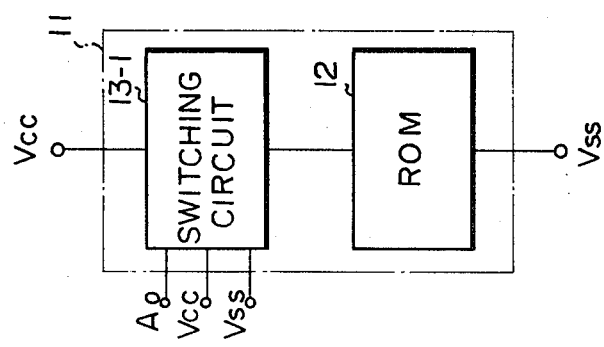
FIG. 2 is a block circuit diagram illustrating a state identifying circuit 11 of FIG. 1.

There are three types of the state identifying circuits 11. In the first type as illustrated in FIG. 2, one terminal of a ROM element 12 is connected via a switching circuit 13-1 to an external terminal such as the power supply terminal $V_{cc}$, while the other terminal of the ROM element 12 is connected directly to another external terminal such as the power supply terminal $V_{ss}$. In the second type as illustrated in FIG. 3, one terminal of the ROM element 12 is connected directly to the power supply terminal $V_{cc}$, while the other terminal of the ROM element 12 is connected via a switching circuit 13-2 to the power supply terminal $V_{ss}$. In the third type as illustrated in FIG. 4, one terminal of the ROM element 12 is connected via the switching circuit 13-1 to the power supply terminal $V_{cc}$, while the other terminal of the ROM element 12 is connected via the switching circuit 13-2 to the power supply terminal $V_{ss}$.

In any type of state identifying circuit 11, when the switching circuit 13-1 (or 13-2) is in an off-state, the ROM element 13 is in a floating state, so that information stored in the ROM element 12 can not be read out at the power supply terminals $V_{cc}$ and $V_{ss}$. However, when the switching circuit 13-1 (or 13-2) is in an on-state, the ROM element 12 is connected to the power supply terminals $V_{cc}$ and $V_{ss}$, so that information stored in the ROM element 12 can be read out at the power supply terminals $V_{cc}$ and $V_{ss}$. That is, the presence or absence of conductance between the power supply terminals $V_{cc}$ and $V_{ss}$ can be detected.

Note that the potentials of the power supply terminals $V_{cc}$ and $V_{ss}$ are, for example, about 5 and 0 volts, respectively, during the normal mode. In addition, it should be noted that the circuit of FIGS. 2, 3 or 4 can be connected between two other external terminals at least one of which is used for an external clock.

Figure 4:
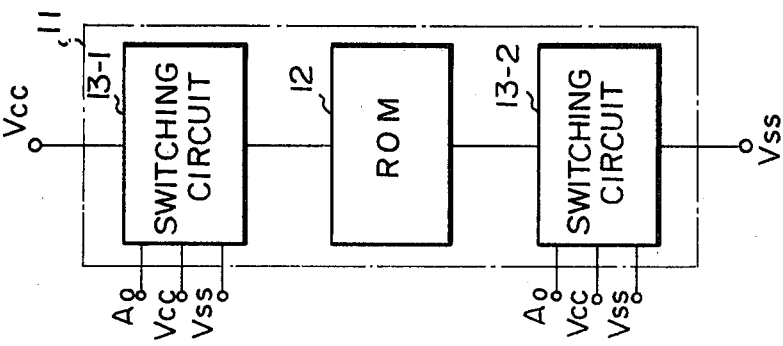
FIG. 4 is another modification of FIG. 2.
Figure 5:
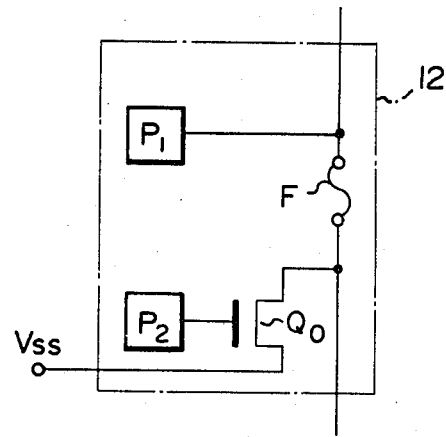
FIG. 5 is a circuit diagram illustrating the ROM element 12 of FIGS. 2, 3 and 4.

FIG. 5 is a circuit diagram of the ROM element 12 of FIGS. 2, 3 and 4. As illustrated in FIG. 5, the ROM element 12 is a fuse type which comprises a fuse F, a MOS transistor $Q_0$ and two pads $P_1$ and $P_2$. In the ROM element 12, the presence and absence of the fuse F correspond to information "0" and "1", respectively. That is, a relatively high voltage is applied to the pads $P_1$ and $P_2$ and the power supply terminal $V_{ss}$ is grounded, so that the fuse F is melted and, accordingly, the information "1" is written into the ROM element 12. Note that the terminal of the transistor $Q_0$ can be connected to an external terminal other than the power supply terminal $V_{ss}$.

Figure 6:
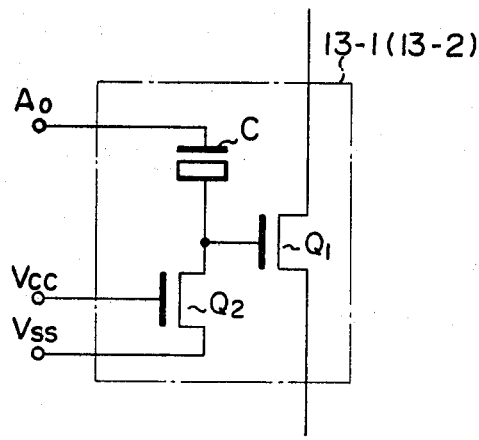
FIG. 6 is circuit diagram illustrating a switching circuit 13-1 or 13-2 of FIGS. 2, 3 and 4.

FIG. 6 is circuit diagram of the switching circuit 13-1 or 13-2 of FIGS. 2, 3 and 4. As illustrated in FIG. 6, the switching circuit 13-1 (13-2) comprises two MOS transistors $Q_1$ and $Q_2$, and a MOS capacitor C. A terminal of the capacitor C is connected to an external terminal which is, for example, the terminal $A_0$. During the normal mode, since the potential of each of the power supply terminals $V_{cc}$ and $V_{ss}$ are 5 and 0 volts, respectively, the transistor $Q_2$ is turned on and, accordingly, the transistor $Q_1$ is turned off, regardless of the potential level of the terminal $A_0$. In other words, the switching circuit 13-1 (13-2) is in an off-state. Therefore, the information stored in the ROM element 12 in FIGS. 2, 3 or 4 can not be read out. Contrary to this, during the check mode, since the potential of the power supply terminal $V_{cc}$ is at a low level, that is, 0.1 to 0.2 volts (in this case, the potential of the power supply terminal $V_{ss}$ is zero), the transistor $Q_2$ is turned off and accordingly, the transistor $Q_1$ is turned on when the potential of the terminal $A_0$ is high. In this state, in FIGS. 2, 3 or 4, if the ROM element 12 is in a conducting state, a current flows therethrough. However, if the ROM element 12 is in a non-conducting state, no current flows therethrough. As a result, the information stored in the ROM element 12 is read out at the power supply terminals $V_{cc}$ and $V_{ss}$ by detecting the presence or absence of a current therethrough.

The power supply terminals $V_{cc}$ and $V_{ss}$ are common to internal circuits other than the state identifying circuit 11 in the semiconductor device of FIG. 1. Therefore, even when the potential of the power supply terminal $V_{cc}$ is low so that the internal circuits can not be operated, leakage currents flow therethrough. Therefore, it may be difficult to determine whether or not the information "1" is written into the ROM element 12 of FIGS. 2, 3 or 4. In this case, it is preferable to use a pulsating signal or an AC signal as the terminal $A_0$. As a result, when the information "0" is written into the ROM element 12, that is, the ROM element 12 is in a conducting state, the current flowing through the power supply terminals $V_{cc}$ and $V_{ss}$ changes in response to the frequency of the terminal $A_0$. Therefore, the information stored in the ROM element 12 can be read easily.

Note that, the transistors $Q_0$, $Q_1$ and $Q_2$ of FIGS. 5 and 6 can be of a bipolar type instead of a MOS type. In addition, in FIGS. 2, 3 or 4, a bit ROM element 12 is shown; however, a ROM for a plurality of bits can be provided. In this case, one or two switching circuits are connected to each bit.

As explained hereinbefore, the semiconductor device according to the present invention has an advantage in that the state of the device stored in a ROM element can be identified without having external terminals used exclusively for the ROM element. In addition, during the normal mode, the ROM element is in a floating state, which causes no effect in the normal operation of the semiconductor device.

I claim:

1. An apparatus associated with evaluation means, comprising:
   interconnection means, semiconductor system means, and state identifying storage means physically associated with one another in accordance with system semiconductor technology and thus forming an entity;

said entity having first, second and third external terminals for connection to external apparatus;

said interconnection means for connecting comprising:
  means for operatively connecting said semiconductor system means to said first and second and third external terminals; and
  means for connecting said state identifying storage means to the same said first, second and third external terminals;

said semiconductor system means for providing operations in accordance with its semiconductor construction, said operations being susceptible to evaluation as to operativeness;

said evaluation means for evaluating the state of operation as to operativeness of said semiconductor system means and for establishing the state in said state identifying storage means in accordance therewith; and said state identifying storage means, for storing the state of operation, being constructed such that the information stored therein may be read out only by detecting a conductance between said first and second external terminals, when external potentials are applied to each of said first and second external terminals at a first and second level, respectively, the difference between said first and second levels being relatively small and when an external potential is applied to said third external terminal at a third level higher than said first and second levels.

2. An apparatus as set forth in claim 1, wherein said state identifying storage means comprises:
  a read only memory element, operatively connected to said terminal pad, for storing the state of operation of said semiconductor system means; and
  a switching circuit, operatively connected to said read only memory element, to said first, second and third terminal pads, for connecting said read only memory element to said first terminal pad when the potentials of said first and second terminal pads are different and at about the first level and when the potential of said third external terminal is at the second level.

3. An apparatus as set forth in claim 1, wherein said state identifying storage means comprises:
  a read only memory element, operatively connected to said first terminal pad, for storing the state of operation of said semiconductor system means; and
  a switching circuit, operatively connected to said read only memory element, to said first, second and third terminal pads, for connecting said read only memory element to said second terminal pad when the potentials of said first and second terminal pads are different and at about the first level and when the potential of said third terminal pad is at the second level.

4. An apparatus as set forth in claim 1, wherein said state identifying storage means comprises:
  a read only memory element for storing the state of operation of said semiconductor system means;
  a first switching circuit, operatively connected to said read only memory element, to said first, second and third terminal pads, for connecting said read only memory element to said first terminal pad when the potentials of said first and second terminal pads are different and at about the first level and when the potential of said third terminal pad is at the second level; and
  a second switching circuit, operatively connected to said read only memory element, to said first, second and third terminal pads, for connecting said read only memory element to said second terminal pad when the potentials of said first and second terminal pads are different and at about the first level and when the potential of said third terminal pad is at the second level.

5. An apparatus as set forth in claim 2, 3 or 4, wherein said read only memory element is of a fuse type.

6. An apparatus as set forth in claim 2, wherein said switching circuit comprises:
  a first transistor having a drain operatively connected to said first terminal pad, a source operatively connected to said read only memory element and a gate;
  a capacitor having a first electrode operatively connected to said third terminal pad and a second electrode operatively connected to the gate of said first transistor; and
  a second transistor having a drain operatively connected to the gate of said first transistor, a source operatively connected to said second terminal pad and a gate operatively connected to said first terminal pad.

7. An apparatus as set forth in claim 3, wherein said switching circuit comprises:
  a first transistor having a drain operatively connected to said read only memory element, a source operatively connected to said second terminal pad and a gate;
  a capacitor having a first electrode operatively connected to said third terminal pad and a second electrode operatively connected to the gate of said first transistor; and
  a second transistor having a drain operatively connected to the gate of said first transistor, a source operatively connected to said second terminal pad and a gate operatively connected to said first terminal pad.

8. An apparatus as set forth in claim 1, wherein said first and second terminal pads are power supply terminals.

9. An apparatus as set forth in claim 1, wherein at least one of said first and second terminal pads is an external clock terminal.

10. An apparatus as set forth in claim 1, wherein said semiconductor system means comprises:
  a memory cell array having memory cells arranged in rows and columns orthogonal to each other and including at least one defective memory cell;
  at least one redundancy memory cell array incorporated with said memory cells along the rows or columns thereof; and
  wherein said state identifying circuit stores information concerning whether said redundancy memory cell array is used instead of said memory cell array.

11. An apparatus as set forth in claim 4, wherein said first switching circuit comprises:
  a first transistor having a drain operatively connected to said first terminal pad, a source operatively connected to said read only memory element and a gate;
  a capacitor having a first electrode operatively connected to said third terminal pad and a second electrode operatively connected to the gate of said first transistor; and a second transistor having a drain operatively connected to the gate of said first transistor, a source operatively connected to said second terminal pad and a gate operatively connected to said first terminal pad.

12. An apparatus as set forth in claim 4, wherein said second switching circuit comprises:

a first transistor having a drain operatively connected to said read only memory element, a source operatively connected to said second terminal pad and a gate;

a capacitor having a first electrode operatively connected to the gate of said first transistor; and a second transistor having a drain operatively connected to the gate of said first transistor, a source operatively connected to said second terminal pad and a gate operatively connected to said first terminal pad.

13. An apparatus as set forth in claim 6, 7, 8, 9, 10, 11 or 12, wherein said third terminal pad has an alternating current signal applied thereto.

* * * * *

UNITED STATES PATENT AND TRADEMARK OFFICE
CERTIFICATE OF CORRECTION

PATENT NO. : 4,428,068

DATED : January 24, 1984

INVENTOR(S) : FUMIO BABA

It is certified that error appears in the above-identified patent and that said Letters Patent is hereby corrected as shown below:

Col. 1, line 43, "13" should be --12--.

Signed and Sealed this

Twenty-sixth Day of March 1985

[SEAL]

Attest:

DONALD J. QUIGG

*Attesting Officer*   *Acting Commissioner of Patents and Trademarks*